No. 818,353. PATENTED APR. 17, 1906.
J. M. COLE.
MEANS FOR PRESERVING FOODS.
APPLICATION FILED AUG. 4, 1904. RENEWED MAR. 24, 1906.

2 SHEETS—SHEET 1.

Witnesses

Inventor
James M. Cole
By Stewart & Stewart
Attorneys

No. 818,353. PATENTED APR. 17, 1906.
J. M. COLE.
MEANS FOR PRESERVING FOODS.
APPLICATION FILED AUG. 4, 1904. RENEWED MAR. 24, 1906.

2 SHEETS—SHEET 2.

Witnesses

Inventor
James M. Cole
By Stewart & Stewart
Attorneys

UNITED STATES PATENT OFFICE.

JAMES M. COLE, OF TACOMA, WASHINGTON.

MEANS FOR PRESERVING FOODS.

No. 818,353.      Specification of Letters Patent.      Patented April 17, 1906.

Application filed August 4, 1904. Renewed March 24, 1906. Serial No. 307,922.

*To all whom it may concern:*

Be it known that I, JAMES M. COLE, a citizen of the United States of America, and a resident of Tacoma, in the county of Pierce and State of Washington, have invented certain new and useful Improvements in Means for Preserving Foods, of which the following is a specification.

My invention relates to certain new and useful improvements in cases designed to contain beef and similar food-stuffs to preserve the same; and the object of my invention is to provide a case which will contain the meat or other food-stuff and in which the meat may be preserved out of contact with the atmosphere.

With these ends in view my invention consists in the particular construction and arrangements of parts, the preferred form of which will be first specifically described and then the invention pointed out in the claim.

Figure 1:
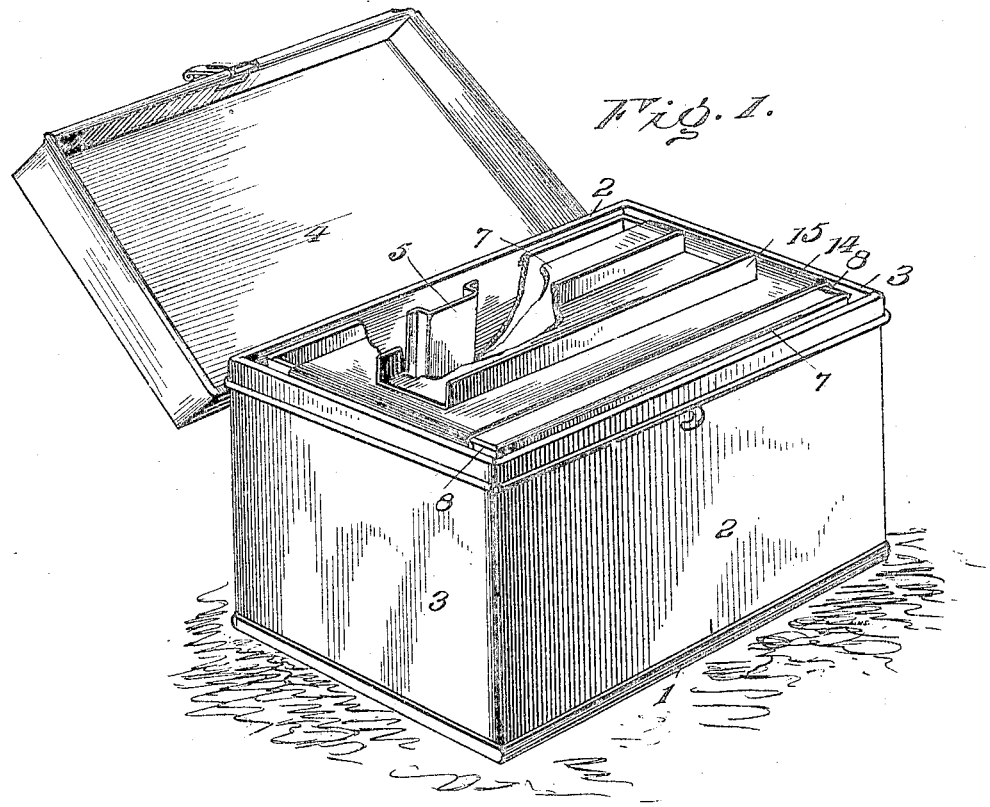
Figure 2:
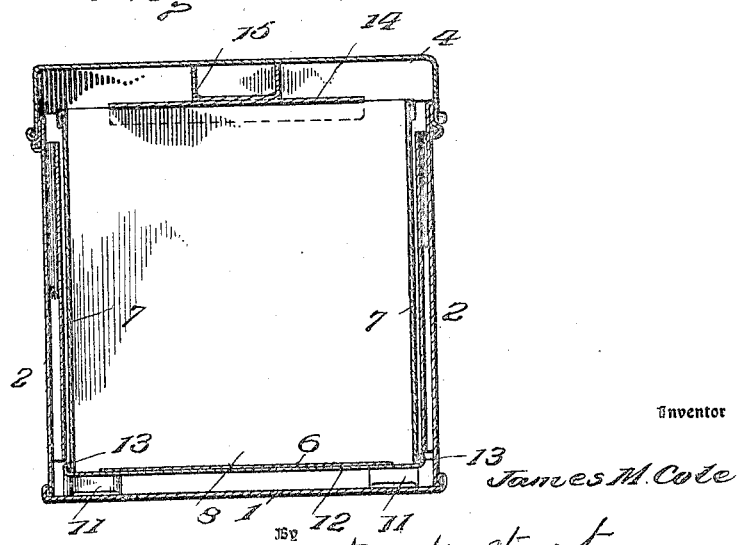
Figure 3:
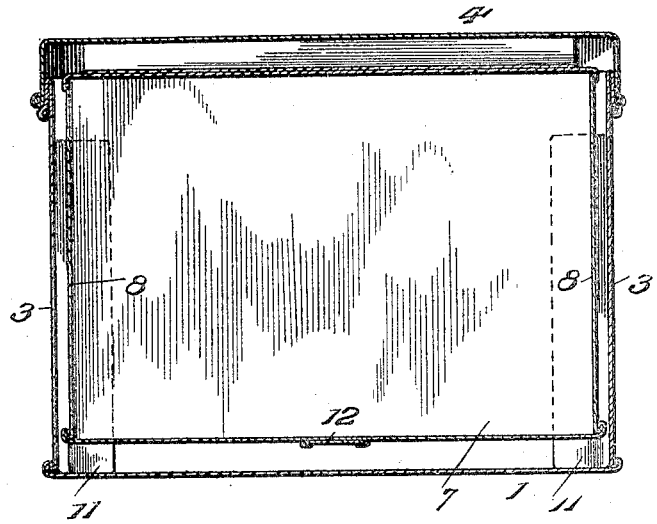
Figure 4:
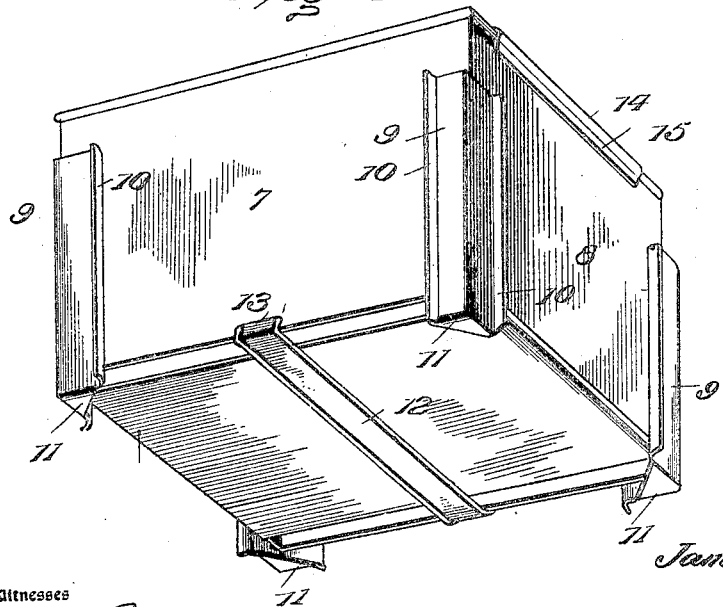

Referring to the drawings, wherein the same part is designated by the same reference-numeral wherever it occurs, Figure 1 is a perspective view of the complete case with the cover raised and parts broken away to more clearly show the construction. Fig. 2 is a central cross-section of the device with the cover closed. Fig. 3 is a sectional view taken at right angles to Fig. 2. Fig. 4 is a perspective view of the inner case.

In the form of my invention shown, I provide an outer box or casing comprising a bottom 1, the sides 2 2, the ends 3 3, and the top 4, preferably and as shown hinged to one side of the box, and it may be provided with some means for securing the top closed. Extending inwardly from the central portion of the sides 2 of the box are the projections 5. The meat or other food to be preserved is supported within this outer casing, so that there is a space all the way around the food to be preserved and the outer casing. This I accomplish by providing an inner casing, (shown in Fig. 4), which is composed of the sides 7 7 and the ends 8 8, forming a rectangular frame. This inner casing is smaller than the outer casing, so that it will fit within the outer casing and leave a space between. In order to hold the inner casing away from the outer casing, I provide at each corner of the inner casing angle-plates 9, having the outwardly-extending portions 10 on their sides, the portions 10 extending outwardly a distance equal to the difference in size between the two casings, whereby the inner casing is held in position at its corners, the projections 5 acting at the middle of the sides. The inner casing is shallower than the outer casing, and the angle-plates 9 extend below the lower edge thereof, forming feet 11, upon which the inner casing rests and by which it is supported.

12 is a slat extending across the central part of the bottom of the inner casing and provided at its outer end with the upturned lips 13, adapted to engage the sides of the inner casing. The slat supporting the bottom 6 is narrower than the frame, as best shown in Figs. 2 and 4.

14 is a slat provided with the downwardly-extending ends 16, adapted to engage over the ends of the inner casing to hold the slat 14 in position on the top of the inner casing. Secured to the upper surface of the slat is a portion 15, which has upwardly-projecting edges adapted to contact with the lid when it is closed and hold the slat on the inner casing and also hold the inner casing in position.

In the operation of this device the meat or other food to be preserved is packed into the inner casing, being supported therein by the slat 12. When the inner casing is filled, the top slat 14 is placed in position and then paraffin or any other oil which will not become rancid is poured in until the space between the inner and outer casing is filled. The cover 4 is then closed and secured. When meat or other food is thus packed, it will keep indefinitely without spoiling, as there is no chance for the air to reach it.

While I have described what I believe to be the preferred form of my invention, I desire to have it understood that many changes may be made therein and the particular form of inner and outer casing changed without departing from my invention.

What I claim as new, and desire to secure by Letters Patent, is—

In a device for preserving foods, the combination with an inner casing comprising a frame, a slat extending across the bottom of the frame, a second slat provided with upturned edges extending across the top of the frame, projections at the corners of the frame and extending downwardly beyond the bottom of the frame, an outer casing in which said inner casing is adapted to be placed and projections upon the outer casing for holding the sides of the inner casing out of contact with the outer casing.

Signed at Tacoma, Washington, this 28th day of July, 1904.

JAMES M. COLE.

Witnesses:
  JOHN A. HAMILTON,
  F. M. GREEN.